United States Patent [19]

Raupp et al.

[11] Patent Number: 5,758,916
[45] Date of Patent: *Jun. 2, 1998

[54] ANTI-JAM PROBE

[75] Inventors: Thomas L. Raupp, Riverview; J. Michael Spall, Plymouth; Kimberly A. Gearns, Northville, all of Mich.

[73] Assignee: Unisys Corp, Blue Bell, Pa.

[*] Notice: The term of this patent shall not extend beyond the expiration date of Pat. No. 5,573,291.

[21] Appl. No.: 743,063

[22] Filed: Nov. 4, 1996

Related U.S. Application Data

[62] Division of Ser. No. 218,091, Mar. 25, 1994, Pat. No. 5,573,291.

[51] Int. Cl.⁶ .................................................. B25B 33/00
[52] U.S. Cl. ............................................. 294/1.1; 81/488
[58] Field of Search .................................. 294/1.1, 2, 15, 294/19.1, 24, 26, 65.5, 99.2; 81/15.9, 487, 488; 15/236.01

[56] References Cited

U.S. PATENT DOCUMENTS

| | | | |
|---|---|---|---|
| D. 261,595 | 11/1981 | Yellin | 294/2 |
| 972,028 | 10/1910 | Schimanski | 294/1.1 |
| 1,540,810 | 6/1925 | Simon | 81/488 |
| 1,751,181 | 3/1930 | Williams | 294/99.1 |
| 2,137,458 | 11/1938 | Phelps | 294/2 |
| 2,281,736 | 5/1942 | Wittenburg | 294/1.1 |
| 3,261,237 | 7/1966 | Sentiff | 294/1.1 |
| 3,819,221 | 6/1974 | O'Connor | 294/1.1 |
| 4,108,026 | 8/1978 | Anderson et al. | 81/488 |
| 4,242,928 | 1/1981 | Haley et al. | 294/26 |
| 4,622,868 | 11/1986 | Flannigan | 294/24 |
| 5,062,672 | 11/1991 | Harris | 294/65.5 |
| 5,156,426 | 10/1992 | Graves | 294/1.1 |
| 5,573,291 | 11/1996 | Raupp et al. | 294/1.1 |

*Primary Examiner*—Dean Kramer
*Attorney, Agent, or Firm*—M. Starr; J. McCorman; N. Cass

[57] ABSTRACT

Disclosed is a probe implement for removing jam debris, including documents, and foreign objects from prescribed document transport track segments of a document processing machine; this implement being constructed of planar, flat elongate thin dielectric material, and being so formed, shaped and constructed as to allow a user to remotely contact and engage such documents, debris or foreign objects and to facilitate removal thereof from the track without disturbing, opening or demounting this track; this implement being further designed, constructed and adapted to be sufficiently flexible in such use to be maneuvered along track segments, to be sized to readily fit into the minimum contemplated track size, while being sufficiently stiff to engage/dislodge such debris.

6 Claims, 4 Drawing Sheets

ANTI-JAM PROBE

This is a division of U.S. Ser. No. 08/218,091, filed Mar. 25, 1994, now U.S. Pat. No. 5,573,291.

FIELD OF INVENTION

This invention relates to the operation and use of high-speed document processing systems, and particularly to means of alleviating and avoiding problems common to the everyday operation of such systems. Particular attention is given to means which permit the operators of such systems to resolve problems integral to their operation without recourse to costly and time-consuming skilled technical personnel, and while avoiding damage to delicate areas by the intervention of unskilled personnel and/or crude implements.

BACKGROUND, FEATURES

Workers in the field of high-speed document processing (e.g. the sorting of bank checks and like financial instruments), know that the art involves using of machines and systems to move and, en route, process documents at sustained rates of thousands of documents per minute, while performing multiple and inter-related operations upon each document as it travels. Such operations might include (but are not limited to) printing on a document (e.g. by contact, dot-matrix, or ink-jet means), reading data previously encoded thereon, recording an archival image of the document by photographic or electronic imaging processes.

Workers will further understand that documents moving through such machines must be very accurately positioned in order to process them accurately. For example, if a document carries a previously encoded line of magnetic characters (known in the art as MICR characters) and the machine is equipped to read and decode such characters, then the machine must present the document to such reading system in correct alignment and position. Other machine systems have similar requirements for correct and reliable alignment and positioning of documents passing through.

Workers will further understand that document-processing now mandates the use of continuous-feed machines, in which the documents are fed in a continuous stream, and at very high speed; with only negligible gaps between them—otherwise the processing rates presently required by customers could not be achieved. As an example, the Unisys DP1800 is a high-speed document processing machine which, will feed 1800 standard documents per minute at a nominal track speed of 300 inches per second (ips) (7.62 meters per second), with an inter-document gap of as little as 3 inches (75 millimeters) which corresponds, given nominal track speed, to an inter-document interval of a mere on-hundredth of a second (10 milliseconds).

Workers will understand that such brief inter-document intervals do not allow a document to be individually aligned and adjusted relative to any process station: rather, it must be kept properly aligned as it passes the stations at all times. Even in "slower" machines (e.g. the Unisys DP500, with a nominal track speed of 100 ips or (2.54 meters per second) the interval between documents is still too brief to permit individual alignment.

Workers will also understand that such document speeds and feed rates requires special transport means: typically high-speed special transport friction-drive rollers and belts, serially arranged to drive the document from point to point. The documents are typically trapped between opposed sets of such rollers and belts, and constrained from distortion by flanking walls. Various process stations are then mounted along said walls, so the walls must be constructed and adapted to permit said process stations to operate upon the passing documents. The need for such transport means and associated track walls is essentially independent of the speed of the document; e.g. they are required in machines of "moderate" speed (e.g. the Unisys DP30, with a nominal track speed of 15 ips (or 0.38 meters per second) as they are in such high-speed machines such as the Unisys DP1800.

Machines here contemplated are designed along these lines, with one convenient construction characterized by a narrow vertical track channel, with walls whose height approaches that of the documents (vertical height); e.g. the order of 4 inches (100 millimeters). Such track walls typically include apertures of various shapes and sizes to permit the driving means (rollers, belts and so on) to drivingly-contact documents in the track. While the track is preferably straight for ease of construction and best document flow, it may also include turns and corners. One finds that good, consistent feeding and driving of documents is obtained if the channel has a very small lateral width relative to its height. Optimal track width will usually vary with document speed. As an example, the nominal track width of the DP1800 product, with a track speed of 300 ips, is 0.10 inches (2.5 millimeters). At lower speeds, narrower track widths may be employed, with consequent improvement in document handling and alignment. As speeds increase, the track width must be increased somewhat, since the increased kinetic energy of the document makes it more likely to jam if the track is too narrow. Workers will readily understand the "trade-off" which must be made between optimal document alignment and consistent document feeding and transport.

CONTEXT OF THE INVENTION

Such a construction, however, tends to bring problems of operations and service which are difficult to anticipate. Even though document process rates are increasing, still customers require ever-better machine reliability. Of course, the impact of an unscheduled stoppage, such as a jam in the track, becomes proportionally greater. Jams and other track disruptions are typically very destructive events, because the machine cannot be stopped quickly enough to avoid driving follow-on documents into the jam-site. The result is typically the destruction of documents, which are crushed, folded and torn; also the machine may be rendered unserviceable for extended periods while the track is cleared and the involved documents accounted for.

Thus, workers agree that jams in a document transport must be prevented; so extensive engineering effort is expended to minimize their occurrence. However, as document feed-rates rise, and as the nature and quality of the documents to be processed becomes more and more varied, jams continue to happen—so one's attention is turned to ensuring that recovery from the occasional jam is as swift and non-disruptive as possible and that it poses minimal risk of damage to the machinery.

Jams are generally caused by a "discrepant document" (e.g. torn, folded or otherwise mutilated), or by associated foreign objects attached to, or entrained with, a document (such as staples and paper clips). No matter how vigilant a machine-operator may be in inspecting documents before they are fed, the sheer volumes handled ensure that occasionally a jam will occur; and, once it does, workers want the operator to be able to clear the jam, retrieve the documents, remove any debris from the track and restart the machine as quickly as possible. This is a general object hereof.

In the past, workers have conventionally met this need by constructing and adapting the document track as to make one or other of the track walls hinged or otherwise quickly demountable, and so allow an operator to open-up the track and access jam-documents, etc. This technique offers varying degrees of success—in some cases, the operator has extensive, adequate access to a track and its contents, but in many other cases, access is limited (e.g. blocked by machine parts such as a read element). And, this technique may require that not only the track walls but also the driving rollers and belts be made hinged or demountable in like manner. This tends to make the mechanisms unduly complex, costly and more prone to failure. Further, some track elements cannot be so constructed; e.g. when they involve integral functions such as print heads, optical heads, magnetic read heads. Nevertheless, the technique of hinged and/or demountable track sections is a valuable one which artisans use whenever appropriate.

However, there are cases where it cannot be employed—typically in and around a machine process station. These cases are becoming more numerous as customers ask that more processing be integrated into a machine. For such cases, one should develop alternative means for machine operators to clear jammed documents and debris from a document track. Such is an object hereof.

In the past, operators have addressed these issues by using "ad hoc tools" and methods readily at hand. So we have seen various hooks and other implements, fashioned by operators themselves, used to probe the closed sections of a jammed track in an effort to dislodge and extract documents and debris. Such devices as wire coat hangers, spring-hooks button-hooks and knitting needles have all been used. The results of the use of such techniques has often been unacceptable damage to the track and especially to delicate process devices, such as a read head, a print head or an optical reading device (incorporated along the track). In their understandable desire to clear the machine as quickly as possible, and resume operations, operators have occassionally so damaged the machine with improvised implements to put it out of action for hours or even days.

Accordingly, we have devised—according to this invention—a "universal jam-relief implement", especially adapted to clear documents and debris from the track of any document-processing machine, and to enable operators to quickly and efficiently do so without risk of damage to delicate mechanisms. As a feature of advantage, we have devised and constructed this implement to be very inexpensive to manufacture; e.g. so one may offer it to his customers at or near zero cost, and so facilitate their operations and minimize service cost and machine down-time. Our object has been to make the improvements in customer availability and service cost of such a device more than outweigh its negligible cost, producing net benefits to customers and to machine manufacturers. Additionally, we have made this implement so far as possible "universal" to such machines, irrespective of manufacture.

Thus, it is an object hereof to alleviate such problems and provide at least some of the here-described features and advantages. A more particular object is to provide means for removing jammed documents and related objects from a document transport track. Another object is to do so with a simple, inexpensive, safe and efficient "universal" probe implement.

The methods and means discussed herein will be generally understood as constructed and operating as presently known in the art, except where otherwise specified; and with all methods, materials, devices and apparatus herein understood as being implemented by known expedients according to present good practice.

BRIEF DESCRIPTION OF FIGURES

These and other features of advantage of the present invention will be appreciated by workers as they become better understood by reference to the following detailed descriptions of the present preferred embodiment, which should be considered in conjunction with the accompanying drawings and figures, wherein like reference symbols denote like elements.

FIG. (1) diagrammatically depicts the typical construction of the track of a document processing machine, showing a document transported between the track walls of the track. (Also shown for reference are typical and exemplary document driving elements, consisting of driving rollers and belt; and an exemplary situation of debris jammed in the track)

Figure 2A:
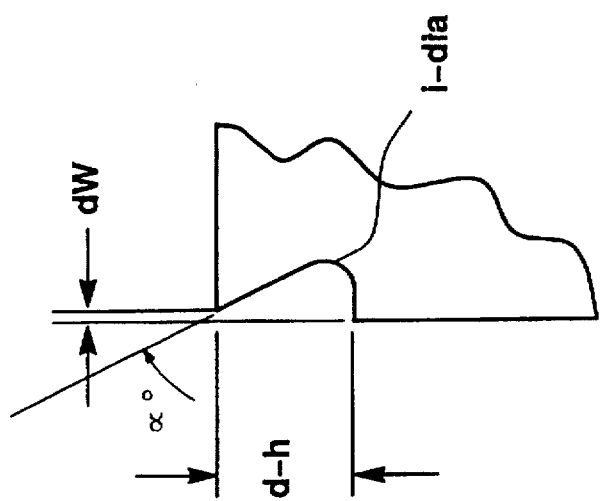
Figure 2B:
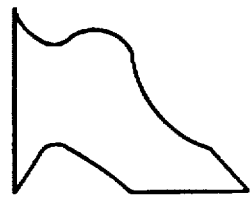

FIG. (2) shows the preferred embodiment of a "universal probe" implement embodiment, devised to aid in the removal of debris in a document track such as that depicted in FIG. (1);

FIG. 2A is an enlarged view of a preferred and exemplary geometry of such device; while FIG. 2B shows a like geometry; and FIGS. 2C, 2D, 2E, 2F show different, non-preferred geometries.

Dimensions are shown, as adapted to use in certain machines; however, these dimensions are merely exemplary, and the invention is capable of being constructed in a wide range of profiles and sizes, as required by the geometry of a subject machine.

DESCRIPTION OF PREFERRED EMBODIMENT

Reference to FIG. (1) will show a jam condition in an examplary document processing machine apt for using our invention. The documents to be transported (e.g. d shown) are constrained between parallel vertical track walls W—W, one on each side of the document, and are rising above a track base element B. The documents are driven by means of rotating, compliant rollers R—R and/or between a pair of drive belt means DB. Said driving means are constructed and adapted to drive the bottom edge of a document down against track base B, to thus ensure its consistent vertical alignment at all times. (Such construction and adaptation falls outside the scope of the instant invention and is thus not shown in detail).

As an exemplary instance, a case is shown in which a foreign object F, (in this case a common paperclip), has become lodged at the bottom of the track, resting on track base B. Workers will readily understand how difficult it can be to readily access such a foreign object F (e.g. if the track walls W—W and track base B cannot be moved or demounted, as is more conventional).

FIG. (2) shows a preferred embodiment of our "universal probe" embodiment Q which we have developed. It consists of a single piece of laminar thermoplastic (or like non-conductive) material, shaped and formed, as shown, to be thrust along a track (e.g. between the closed track walls W—W from above). The four end-corners of implement Q are formed and shaped to form a hook-like profile, which is intended to engage foreign objects, such as the paper clip F pictured in FIG. (1). Probe Q will either permit the operator to remove clip F through the top opening of the track, or drive it laterally along the track until access may be had (e.g. where a track wall W has been relieved or demountably constructed, allowing for the removal of the object). Workers will readily understand that if such an implement is made sufficiently thin, smooth and stiff, it may be readily maneuvered between the compliant drive rollers R—R and drive belts means DB without damaging them, yet losing engagement with a foreign object F.

Probe Q is preferably of non-conductive material to be sure that a user doesn't get coupled to voltages that might be present.

Figure 1:
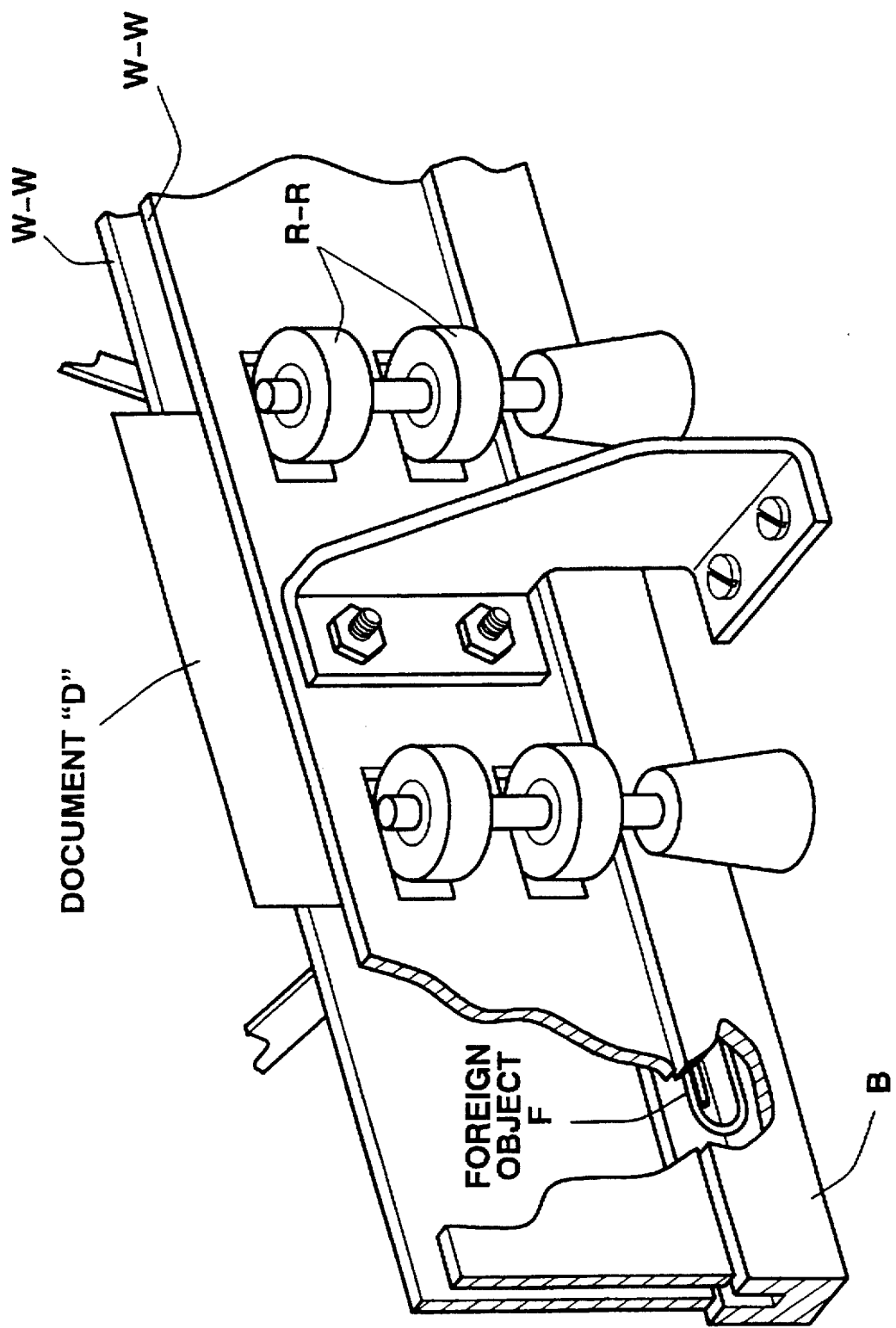
FIG. 1A shows a plan view and FIG. 1B an end view thereof.
Figure 1B:
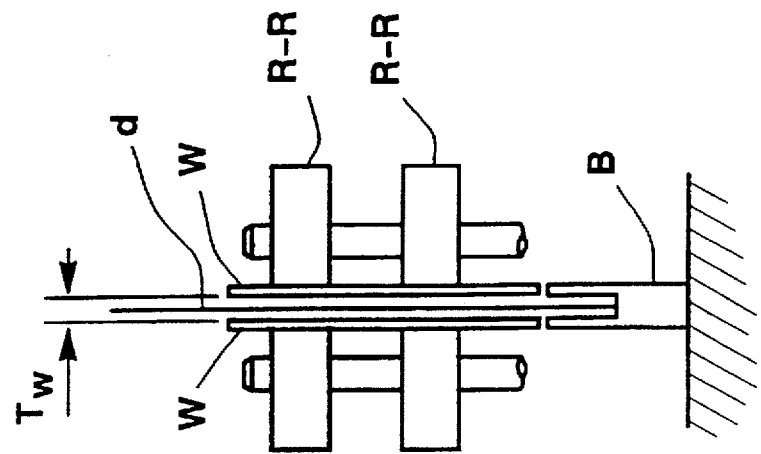
Figure 1A:
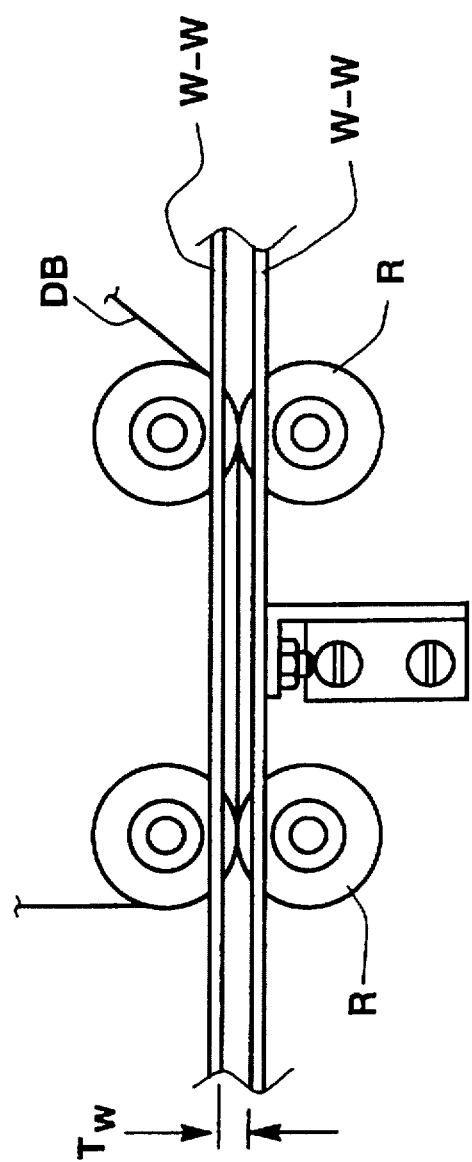

Probe Q is preferably constructed of polycarbonate sheet material (for example, stamped from "LEXAN" by General Electric Co.), or like material that will not likely damage metal or plastic parts along a track, and whose thickness th is selected to approximate the minimum track-width contemplated, (e.g. see width Tw in FIGS. 1B, 1A). Of course LEXAN or the like can pierce paper, but this is understood as acceptable. This material is selected because of its intrinsic toughness and flexibility, (springy reaction), coupled with a compliant and non-marring surface which will minimally damage the documents, or the track or surrounding components of this machine, no matter how vigorously applied.

Early embodiments of this implement Q were constructed of transparent material, this being the least costly form in which it is available. Experience showed us that it is better constructed of an opaque or coloured material, since the transparent versions were virtually invisible (e.g. when left on a table) and were soon misplaced.

We have constructed embodiments of this device varying in thickness between 0.020 inches (20 mils, or 0.5 millimeters) and 0.080 inches (2.0 millimeters). We find that embodiments which are very much thinner than this range tend to be somewhat too flimsy to reliably engage debris in the track. Embodiments which are very much thicker than this range can be difficult to maneuver between the driving elements. As a general rule, we prefer embodiments with thicknesses towards the lower end of this range (e.g. 20–40 mils). Their increased flexibility makes them easier to maneuver into and out of the track; yet they still retain sufficient rigidity to reliably engage and extract foreign objects. In addition, the thinner embodiments are adapted for use in a wider range of machines (minitrack widths), since they will fit into a wider range of track widths. A probe should be long enough to be "gripped" by the user, yet not so long as to be too flexible (e.g. here 4–8" was found suitable).

FIG. 2A shows an enlarged fragmentary plan of the geometry of an operating (end-corner) area of probe Q. While this represents optimal geometry, workers will readily understand that this geometry is capable of many and various variations and permutations depending upon the particular application for which it is intended (e.g. see less preferred geometries in FIGS. 2C, 2D, 2E, 2F). To obtain the maximum possible life and utility from our embodiment, we preferably reproduce this geometry on all four corners of probe Q; effectively quadrupling its utility at a minimal increase in cost.

Figure 2:
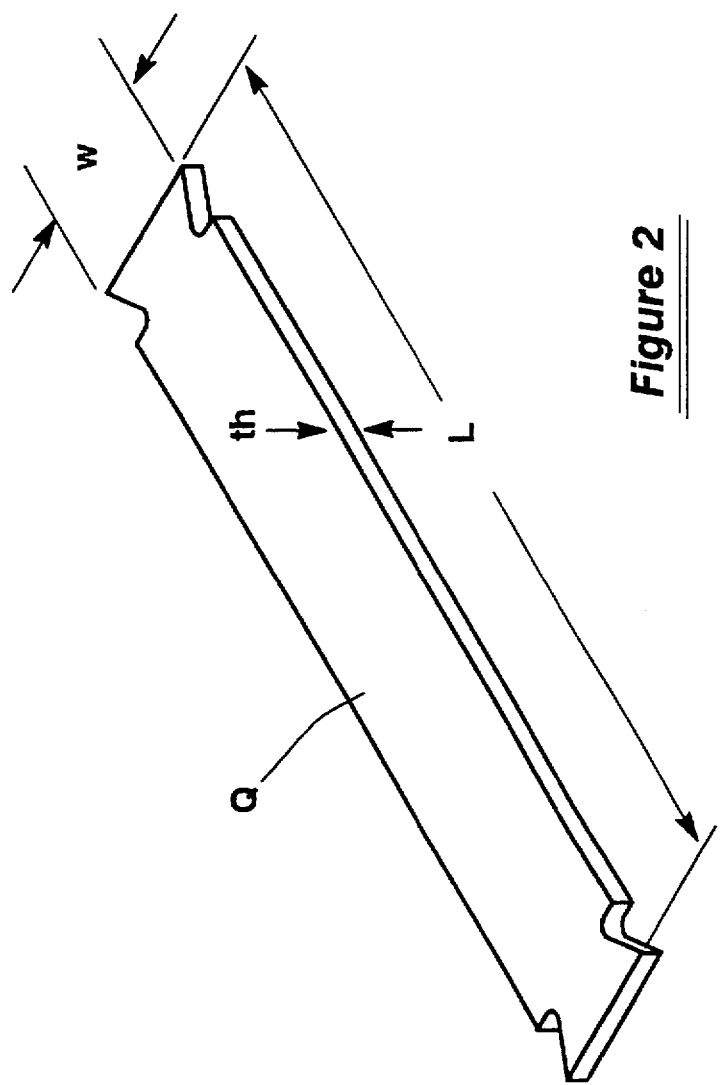
Figure 2D:
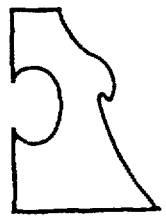
Figure 2C:
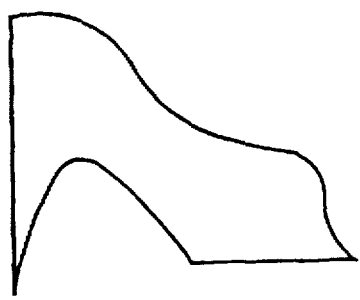

The corner-cutouts (FIGS. 2, 2A) form a concavity (e.g. 0.38" long here) that forms a "hook" of sorts (e.g. angle $\alpha°$ less than 90°, FIG. 2A), that is useful to extricate jam-matter; and that preferably leaves an end-corner that is robust enough to resist breaking-off (e.g. preferably raised at $\alpha°$ of about 30° up from the horizontal—e.g. versus non-preferred cut-out of FIG. 2C which is so attenuated it is apt to break-off). A more symmetrical cut-out may also be preferable for some instances (e.g. as in FIG. 2B); also the inner radius (ir, FIG. 2A) is large enough to reduce chances of tearing the tool from the corner when it is pulled toward the user.

Figure 2F:
Figure 2E:
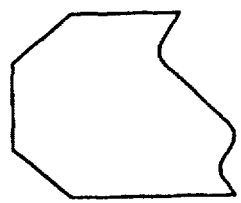

FIG. 2B similarly illustrates a modified cut-out to give similar results. FIGS. 2C, 2D, 2E, 2F illustrate non-preferred "corner geometry": i.e. the square (90°) corner of FIG. 2F was found unable to "lift" jam matter (no "hook"), as was the "beveled" corner of FIG. 2E; while the "end-pocket" (or "internal-hook") geometry of FIG. 2D was not very good at "lifting" (e.g. versus "external-hooks" of FIGS. 2, 2A, 2B). The "sharper" attenuated corners of FIG. 2C were too apt to break-off. Also, the blunt ends of FIGS. 2D, 2E, 2F are more apt to compress material further into a jam, while the corners in FIGS. 2, 2A, 2B, 2C were more likely to "spear-into" a jam. Such a "plastic" probe is less apt to damage metal/plastic parts (e.g. and be itself damaged—which is preferable).

RESULTS

It will be apparent that any aforedescribed invention is apt for effecting the objects mentioned; e.g. to remove jammed checks and like objects from a document-transport track. We have found that such embodiments can be used to quickly and effectively remove such objects yet with no harm to the machine.

Of course, certain modifications to the described preferred embodiment are possible without departing from the spirit of the present invention. For example, there are other ways to provide "external-terminal" hooking corners; so the present invention is not limited to the particular form illustrated or to the particular illustrated type of machine. Additionally, some features of the present invention can be used to advantage without the corresponding use of other features.

Accordingly, the description of the preferred embodiment should be to be considered as including all possible modifications and variations coming within the scope of the invention as defined by the appended claims.

In conclusion, it will be understood that the preferred embodiment(s) described herein are only exemplary, and that the invention is capable of many modifications and variations of construction, arrangement and use without departing from the spirit of the claims. The examples of possible variations of the present invention are merely illustrative, and accordingly, the present invention is to be considered as including all possible modifications and variations coming within the scope of the invention as defined by the claims appended hereto.

What is claimed is:

1. An unjamming implement for loosening and removing debris from prescribed narrow, constricted article transport track segments of an article processing machine; said implement being constructed of planar, flat, elongate flexible dielectric material, and being so formed, shaped and constructed as to allow a user to remotely contact and engage such debris and to facilitate removal thereof from a track segment without disturbing, opening or demounting the segment; said implement being dimensioned to readily fit into the minimum contemplated track size and being further designed, constructed and adapted to be sufficiently flexible in such use to be maneuvered along said narrow, constricted track segments, while yet also being sufficiently stiff to engage/dislodge such debris;

said implement being relatively smooth and strip-shaped with at least one end having a pair of like opposed concavities adapted to present a hook-like structure for better engaging said debris.

2. An unjamming implement for loosening and removing debris, from prescribed transport track segments of an article handling machine; said implement being constructed of planar, flat, elongate flexible material, and being so formed, shaped and constructed as to allow a user to remotely contact and engage such debris and facilitate removal thereof from the track without disturbing, opening or demounting track structure; said implement being further designed, constructed and adapted to be sufficiently flexible in such use to be maneuvered along a track segment, while nonetheless being sufficiently stiff to dislodge such debris, and being sized to readily fit into the minimum contemplated track size, and with at least one end having a pair of opposed like concavities adapted to form a hook-like structure.

3. An unjamming implement for loosening and removing debris, from prescribed article transport track segments of an article processing machine; said implement being constructed of planar, flat, elongate flexible material, and being so formed, shaped and constructed as to allow a user to remotely contact and engage such articles, debris or foreign objects and to facilitate removal thereof from the track segment without disturbing, opening or damaging the track; said implement being further designed, constructed and adapted to be sufficiently flexible in such use to be maneuvered along said track segments, while yet being sufficiently stiff to engage/dislodge such debris; and being dimensioned to readily fit into the minimum contemplated track size, said implement further being relatively strip-shaped with at least one end having a pair of opposed like indentations adapted to facilitate hooking onto debris.

4. An unjamming implement for loosening and removing debris, from prescribed narrow, article transport track segments of an article processing machine; said implement being constructed of planar, flat, elongate flexible material, and having smooth surfaces, being so formed, shaped and constructed as to allow a user to remotely contact and engage such articles, debris or foreign objects and to facilitate removal thereof from the track segment without disturbing, opening or damaging the track; said implement being further designed, constructed and adapted to be sufficiently flexible in such use to be maneuvered along said track segments, while yet being sufficiently stiff to engage/dislodge such debris; and being smooth-sided and dimensioned to readily fit into the minimum contemplated track size and be thrust there along without snagging, said implement further being relatively strip-shaped with at least one end having, like concavity means adapted to facilitate hooking onto debris.

5. A probe implement for loosening and removing debris, from prescribed narrow article transport track segments of an article processing machine; said implement being constructed of smooth, elongate flexible material, and being so formed, shaped and constructed as to allow a user to remotely contact and engage such articles, debris or foreign objects and to facilitate removal thereof from the track segment without disturbing, snagging opening or damaging the track; said implement being further designed, constructed and adapted to be sufficiently smooth and flexible in such use to be maneuvered along said track segments, without snagging, while yet being sufficiently stiff to engage/dislodge such debris; and having like indentation means on at least one end adapted to facilitate hooking onto debris.

6. A unjamming probe implement for loosening and removing debris from prescribed article transport track segments of an article processing machine; said implement being constructed of relatively, elongate material, and being so formed, shaped and constructed as to allow a user to remotely contact and engage such articles, debris or foreign objects and to facilitate removal thereof from the track segment without disturbing or damaging the track; said implement being further designed, constructed and adapted to be sufficiently smooth and flexible in such use to be maneuvered along said track segments, without snagging, while yet being sufficiently stiff to engage/dislodge such debris; and being dimensioned to readily fit into the minimum contemplated track size, with at least one end having like indentation means adapted to facilitate hooking onto debris.

* * * * *